United States Patent
Van Engelshoven et al.

(10) Patent No.: US 8,428,815 B2
(45) Date of Patent: Apr. 23, 2013

(54) METHOD AND SYSTEM FOR THE MANAGING VEHICLE DATA

(75) Inventors: Kai Van Engelshoven, Koenigswinter (DE); Andreas Haendler, Bad Honnef (DE)

(73) Assignee: Deutsche Telekom AG, Bonn (DE)

(*) Notice: Subject to any disclaimer, the term of this patent is extended or adjusted under 35 U.S.C. 154(b) by 804 days.

(21) Appl. No.: 12/103,115

(22) Filed: Apr. 15, 2008

(65) Prior Publication Data
US 2008/0263100 A1 Oct. 23, 2008

(30) Foreign Application Priority Data

Apr. 16, 2007 (DE) .................... 10 2007 018 139

(51) Int. Cl.
G06F 7/00 (2006.01)
G06F 19/00 (2006.01)
G01M 17/00 (2006.01)

(52) U.S. Cl.
USPC ........ 701/33.4; 701/29.1; 701/32.7; 340/438; 340/459

(58) Field of Classification Search ........... 701/29.1, 701/29.6, 32.7, 33.4; 702/187; 340/438, 340/459
See application file for complete search history.

(56) References Cited

U.S. PATENT DOCUMENTS

| | | | |
|---|---|---|---|
| 5,797,134 A | 8/1998 | McMillan et al. | |
| 6,690,293 B2 * | 2/2004 | Amita | 340/928 |
| 6,823,317 B1 * | 11/2004 | Ouimet et al. | 705/13 |
| 7,522,881 B2 * | 4/2009 | Yamagiwa | 455/41.2 |
| 2002/0173885 A1 * | 11/2002 | Lowrey et al. | 701/29 |
| 2004/0093264 A1 | 5/2004 | Shimizu | |
| 2005/0065711 A1 * | 3/2005 | Dahlgren et al. | 701/117 |
| 2005/0173523 A1 | 8/2005 | Yushio et al. | |
| 2005/0174217 A1 * | 8/2005 | Basir et al. | 340/425.5 |
| 2006/0182055 A1 * | 8/2006 | Coffee et al. | 370/328 |
| 2006/0206584 A1 | 9/2006 | Hyder et al. | |

FOREIGN PATENT DOCUMENTS

| | | | |
|---|---|---|---|
| DE | 10021733 A1 * | 11/2001 | |
| EP | 1548242 A1 | 6/2005 | |
| WO | WO 9009645 A1 | 8/1990 | |
| WO | WO 2006099299 A2 | 9/2006 | |

OTHER PUBLICATIONS

European Search Report for EP08007253, Jul. 30, 2009.
Toll Collect: "Das ABC des Lkw-Mautsystems" Jan. 2005, Toll Collect, Berlin, XP002496738.

* cited by examiner

*Primary Examiner* — Thomas Tarcza
*Assistant Examiner* — Adam Tissot
(74) *Attorney, Agent, or Firm* — Leydig, Voit & Mayer, Ltd.

(57) ABSTRACT

A method for managing vehicle data of a motor vehicle includes storing the vehicle data in an on-board memory. The stored vehicle data is associated with the vehicle using a vehicle identifier. The stored data is transmitted via a telecommunications connection to a data processing center of a telecommunications network. The transmitted data is made available at the data processing center for retrieval by third parties.

24 Claims, 3 Drawing Sheets

METHOD AND SYSTEM FOR THE MANAGING VEHICLE DATA

CROSS REFERENCE TO RELATED APPLICATIONS

This application claims priority to German Patent Application No. 10 2007 018 139.8, filed Apr. 16, 2007.

FIELD

The present invention relates to a method for managing data, in particular operational data of a motor vehicle, in which method the vehicle data is written to and stored in an on-board memory. The present invention also relates to a system for managing data, in particular operational data of a motor vehicle, which system is suitable for carrying out the method of the present invention.

BACKGROUND

It is generally known to store a number of items of motor vehicle data within the vehicle, such as, for example, data that is known from the manufacturing process, or data occurring during operation of the vehicle. For example, the chassis identification number, which is inseparably connected to a motor vehicle, could not only be embossed into the vehicle chassis, but also be stored electronically in a memory of the vehicle.

It is also known to store operational data, such as miles traveled, in a memory of the vehicle, and to make such data available for retrieval, for example, by service shops. It is known, for instance, to provide the key of a motor vehicle with a memory in which such mileage data is stored, so that when the key is handed over to a service shop, the service shop can directly access such relevant information by reading out the memory in the key.

In this prior procedure, it is considered to be disadvantageous that the data written into the electronic memory is usually accessible only to authorized repair shops and dealers. Furthermore, it is only when the vehicle is taken to a dealer or authorized repair shop that such dealer or repair shop has access. Thus, vehicle-related information arising during the life of a particular motor vehicle is neither available to the manufacturer, nor to a dealer or authorized repair shops.

However, such information is of particular interest especially to motor vehicle manufacturers, because they usually endeavor to continuously improve their vehicles, and because such improvements should take into account data obtained from vehicles. Until now, manufacturers had to subject their vehicles to extended field tests (i.e., merely internal tests), in order to obtain data from the vehicles for purposes of vehicle improvement and optimization. The prior art does not provide the ability to obtain data related to a motor vehicle from the day-to-day use, and thus, throughout the life of a vehicle, from first registration to scrapping.

SUMMARY

In an embodiment, the present invention provides a method for managing vehicle data of a motor vehicle. The method includes: storing the vehicle data in an on-board memory; associating the stored vehicle data with the vehicle using a vehicle identifier; transmitting the stored data via a telecommunications connection to a data processing center of a telecommunications network; and making the transmitted data available at the data processing center for retrieval by third parties.

BRIEF DESCRIPTION OF THE DRAWINGS

Aspects of the present invention will now be described by way of exemplary embodiments with reference to the following drawings, in which.

DETAILED DESCRIPTION

Figure 1:
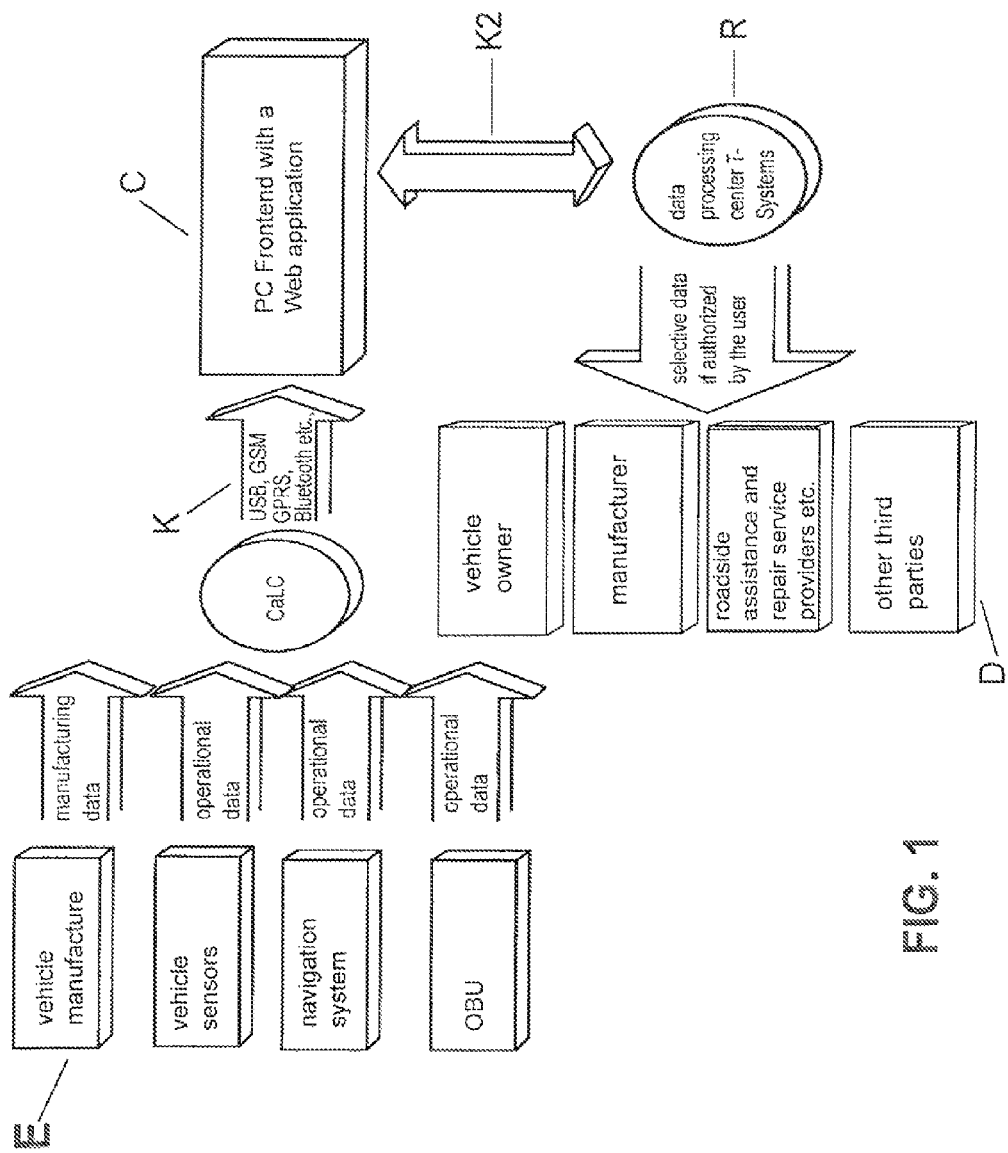
FIG. 1 is a schematic chart illustrating a basic principle of the present invention.

It is an aspect of the present invention to provide a method and a system for carrying out this method, by which substantially any third party, or predetermined third parties, can be given access to data of motor vehicles, including data which is inherently connected to the vehicle, such as manufacturing data, and data occurring during operation of the vehicle, in particular during day-to-day use by the end user.

For example, it should be possible to allow such arbitrary or predetermined third parties to offer services or, as the case may be, to generate vehicle data related services only internally. Such services are here understood to include any applications and/or analyses related to data from a particular motor vehicle. These may be services or applications that are available only to the third party concerned, or ones made available by the concerned third party to the outside world, such as, for example, to the user of a motor vehicle, to the motor vehicle owner, and/or to other authorized entities.

A method according to the present invention includes associating the stored data, in particular operational data, with the vehicle, and here particularly with the vehicle which itself has acquired the operational data, by means of a vehicle identifier. Such a vehicle identifier may, for example, be the chassis identification number, which does not change throughout the life of a vehicle, from first registration to scrapping.

However, it is also possible to use the license plate number as the vehicle identifier, In this case, however, it should be noted that the license plate number may change, especially when the ownership of the vehicle changes. It is also possible to use any other vehicle identifiers that enable a vehicle to be uniquely identified.

Thus, by this association alone, the operational data that is acquired in an on-board memory, particularly by the vehicle itself and, as the case may be, data that is externally written into the memory, for example, by third parties, such as the vehicle owner or repair shops, etc., is reliably and uniquely associated with the particular vehicle concerned.

Further in accordance with the present invention, the data present in the on-board memory is transmitted, either by direct or indirect communication, to at least one data processing center within a telecommunications network, where said data is kept available for retrieval by interested third parties. In particular, by transmitting the data to a data processing center external to the vehicle, it is made possible to keep the data available for access by third parties. The third parties that are intended to be granted access to this data may possibly be arbitrary third parties, or predetermined third parties.

Within this invention, interested third parties are understood to include, but are not limited to, manufacturers, dealers, vehicle users, in particular vehicle owners, authorities, insurance companies, roadside assistance service providers, or other third parties.

Any of these third parties may be interested in using this vehicle data. For example, the data obtained during everyday use enables manufacturers to gain information that allows them to improve their vehicles, in particular on the basis of common usage patterns of the respective vehicle users.

Dealers, especially those who maintain regular service shops, can thus obtain interesting and important vehicle-related data from the on-board memory at any time through communication and access via the data processing center, especially during maintenance. As mentioned before, such data may include the usage patterns of vehicle users, such as, for example, the frequency and type of control actions, including, for example, the driving style, which may be interesting especially to car rental agencies. Furthermore, authorities may use the vehicle data to obtain information to be used as a basis for their services and obligations, such as for charge calculation purposes.

Insurance companies may use the data to obtain information that allows them to determine an insurance premium individually, for example, based on mileages traveled, driving behavior, etc. Furthermore, roadside assistance service providers may use the data to obtain information that may enable faster troubleshooting in the event of a malfunction.

The above listing is not meant to be exhaustive, but exemplary, since, in addition to the possible applications mentioned above, many other applications may be envisioned, regardless of whether they are already known or still to be discovered.

In one embodiment according to the present invention, a vehicle may have an on-board communication device by which the data is transmitted directly from the vehicle to the at least one data processing center via a telecommunications network.

Such a communication device may already be provided by a cellular telephone device, which, today, is often available in vehicles anyway to enable vehicle users to use mobile communications services. Via such a communication device, the data stored in the memory on board the vehicle may be communicated via a telecommunications network to the at least one data processing center and stored therein, in particular during periods when the communication device is not used by the vehicle user himself/herself. For this purpose, the protocols that are usually used during a mobile communication session in accordance with current standards may be used, such as, for example, packet data transmission, SMS or e-mail services.

Alternatively, the vehicle may have an on-board communication device that is dedicated exclusively for this purpose and, therefore, functions autonomously and independently of any mobile telephone device that may be present in the vehicle. Consequently, the method of the present invention may also be carried out in vehicles which are not equipped with such personal communication means of vehicle owners.

The particular advantage of providing a communication device directly in the vehicle is that the transmission of acquired data to the at least one data processing center via a telecommunications network may possibly be accomplished even in real time.

Thus, for example, a dedicated telecommunications line may be provided between a vehicle and the data processing center, or a communication connection to the data processing center may be established at fixed points in time, or at times when the on-board memory has reached its maximum storage capacity.

Thus, since the on-board communication device enables the vehicle to operate completely autonomously, such data transmission can be performed at essentially any time, especially when the reception and transmission conditions are suitable.

In another embodiment, which may be used alternatively or in combination, the vehicle may include a communication device by which the data is first transmitted to one of a plurality of stationary receiving stations, the data subsequently being forwarded from the receiving station to the at least one data processing center via a telecommunication connection.

Such a communication between a communication device of the vehicle and a stationary receiving station, which provides at least receiving capabilities for unidirectional data communication and possibly also transmitting capabilities for bidirectional communication, may be accomplished, for example, by near field communication.

Near field communication is here understood to be a communication over a distance ranging substantially from 1-100 meters, preferably from 1-10 meters. Thus, a near field communication of this kind can be accomplished using established standard methods, such as communications via RFID transponders and receivers and via Bluetooth or WLAN. Of course, it is possible to develop a separate standard for this type of communication.

The plurality of stationary receiving stations mentioned herein may include, but are not limited to, receiving devices at gas stations, at bridges (because at bridges, such devices are often available at tollgates anyway), at vehicle safety inspection stations (where vehicles must be inspected on a regular bases, at least at intervals of one or more years), at parking lots, at traffic lights, etc.

Ultimately, any location is suitable that is very likely to be regularly frequented by vehicles, so that data can thus be exchanged and communicated to the at least one data processing center on a regular basis. The further communication between a receiving station and the at least one data processing center can be accomplished via conventional communication paths, for example, in the same way as in the direct communication between the vehicle and the data processing center, that is, for example, by mobile communication, land-line communication, Internet, e-mail, etc.

In yet another embodiment, which may be used alternatively or in combination with the previous embodiment, a vehicle may include a portable data storage medium that can be removed from the vehicle and used to extract data from the vehicle and transfer it to a data processing system, the data being transmitted from the data processing system to the at least one data processing center via a telecommunications network. Thus, the data is transferred indirectly.

In the process, the data may be automatically transmitted to the data processing center at the moment it is transferred from the removable data storage medium to the data processing system, or at predetermined times thereafter. Alternatively, the forwarding of the data to the data processing center may be performed only upon request by either the data processing center or the user of the data processing system.

The data processing system may be, for example, a computer at the disposal of the vehicle user. Thus, the data obtained in the vehicle can also be made available to the vehicle user by direct access, without the vehicle user having to gain access via the data processing center. This also allows a vehicle user to add data which is then transferred to the removable data storage medium and/or is at least added to the data set and is then available for transmission to the data processing center.

In addition, this allows a vehicle user to perform analyses on the acquired data himself/herself, and, for example, to influence the fuel economy impact of his/her driving style based on the data obtained on the miles traveled and fuel consumption. Furthermore, it would be possible to keep a driving log or to perform other applications.

In any of the various alternatives and combinable embodiments mentioned above, the data may be transmitted in a manner limited by volume or category, especially if the data is communicated by means of a data storage medium, at least over portions of the total transmission path.

Thus, for example, if the on-board memory is cleared and made available to receive new data when the data has been transmitted from the on-board memory to the data processing center or transferred from the on-board memory to a data processing system by means of a removable data storage medium, it is possible to limit the memory space of the on-board memory.

Thus, the on-board data memory will hold only the current data that has accumulated since the last time that data was transmitted to the data processing center or removed by means of a removable data storage medium.

Moreover, the data may be classified into categories and transmitted in a manner limited by category. In principle, any type of categorization may be used for this purpose, for example, categorization for specific third parties, such as, for example, by manufacturer data, user data, dealer data, repair shop data, authority data, etc. However, it is also possible to use any other type of category not mentioned herein.

Moreover, the data may be categorized, for example in the aforementioned manner, so as to limit third party data access in a category-dependent manner. Thus, for example, specific third parties may be granted access only to the portions of the data that they are authorized to see. Thus, for example, authorities may not be granted access to data that is only relevant to the manufacturer of a motor vehicle. This makes it possible, for example, to preclude cross-category data access. However, specific types of data may exist in several categories at the same time.

In this connection, the categorization of the data may be performed directly in the vehicle, so that this aspect of data management is taken care of by the vehicle itself, and thus, the data transmitted is already fully categorized.

In another embodiment, the data may be transmitted in uncategorized form to the data processing center, and a categorization is then performed within the data processing center. The categorization rules may be maintained and changed, if necessary, within the data processing center.

In another embodiment, the user of a vehicle may allow use of the data of his/her vehicle, and such authorization may, in particular, be granted in a category-dependent manner. Thus, in particular, it is possible to take into account provisions of the data protection law in Germany and other countries. Accordingly, a motor vehicle, and a system for carrying out a method according to the present invention, may be provided with this capability as a standard feature, provision being for such a method to be carried out only when enabled by the user, especially because when data is transmitted to a data processing center, some information allowing conclusions about the user and the user's behavior may also be automatically transmitted, and thus disclosed, in the process.

Manufacturers, or any other of the aforementioned interested third parties, may incentivize a user to allow use of the data by promising to give the user a bonus, such as discounts on vehicle purchases, tax deductions, discounts on insurance premiums, etc.

In another preferred implementation of the method, vehicle-related charges, such as taxes and insurance premiums or other fees, which may occur in connection with the use of a motor vehicle, may be calculated individually based on the collected vehicle data.

Unlike conventional methods where such charges and contributions are usually calculated on a lump sum basis, the method and system of the present invention allow such charges and taxes to be calculated based on the vehicle data made available, such as fuel consumption and emissions output. Thus, the authorities or other institutions entitled to the charges may access the collected data and calculate the charges on the basis of this data so as to inform the vehicle owner or user of such charges. Furthermore, the system may automatically calculate the charges, for example, in the data processing center, based on the collected data, and inform the authorities and/or the vehicle owners of such charges, so that both parties, i.e., the payor and the payee, are informed of the amount.

In summary, therefore, the method and system of the present invention make it possible to monitor a motor vehicle throughout its life cycle from first registration to disposal (e.g., scrapping) with respect to the data that can be acquired and stored within a motor vehicle. In addition to the data mentioned in the above description, such data may include any data that is provided by a vehicle by means of sensors or other devices and/or added by the user of the vehicle and which is capable of being stored.

In particular, by allowing a manufacturer to access the data via the data processing center, which is incorporated in a telecommunications network, the manufacturer is enabled to monitor a motor vehicle manufactured by them throughout its life cycle, and both to provide corresponding information to the user and to gain information for themselves, for example, with regard to the servicing and improvement of motor vehicles. This also allows vehicle recall campaigns to be personalized for individual users of a motor vehicle, because such a campaign may possibly not affect all vehicles.

When using a portable data storage medium, which may either be used directly as an on-board memory of the motor vehicle or be in communication connection with a memory on board the vehicle, the intention may be for such a data storage medium to be sent to a manufacturer or to an authority at the end of the life of a vehicle. This may be taken as evidence that a motor vehicle was properly disposed of. In this connection, several aspects can be taken into account. First of all, the vehicle owner may receive a certificate of disposal for the deregistration of the vehicle after the portable data storage medium has been turned in or, optionally, the deregistration itself may only be initiated when the data storage medium has been turned in. Secondly, by returning the data storage medium to a manufacturer, especially when the data storage medium used is capable of storing all the data that has accumulated during the life of the vehicle, such data is made available to the manufacturer for analysis.

FIG. 1 is a schematic chart illustrating the basic principle of an embodiment of the present invention. It is shown that there may be provided various units on board the motor vehicle, and also external units E, said units providing data related to this particular vehicle. It is illustrated that this data may, for example, be data related to the manufacture of the vehicle, such as, for example, data that is generated by the manufacturer themselves. Other operational data may be provided, for example, by vehicle sensors, or by a navigation system, or by an on-board unit, i.e., by any unit capable of acquiring data during the life of a vehicle.

FIG. 1 also shows that all of this data, i.e., operational data, manufacturing data, or other data (not shown here) is fed to a memory CaLC, which may be provided on board a vehicle and which, in addition, may be in the form of a portable removable memory. The acronym CaLC stands for Car Lifecycle Card, which may imply that the memory is in the form of a removable memory, such as a memory card, that may be removed from the vehicle by a user and which is capable of storing the aforementioned data.

Thus, a wide variety of vehicle data can be collected in the vehicle and stored in this memory, regardless of whether the memory is a portable or stationary in the vehicle. Examples of portable memories include, in particular, standard ones available today, such as USB sticks or other memory devices having standard interfaces. FIG. 1 further shows that the data may be transmitted from this memory to a data processing center R via a communication connection K2.

It is possible for the data transmission to the at least one data processing center R not to take place by direct communication, but indirectly: first by a communication link K to a computer C, and then by a communication link K2 to data processing center R. Similarly, the data stored in the data processing center may be retrieved and/or used via computer C, for example, via a web interface of the data processing center.

It is also shown that the data stored at data processing center R can be accessed by a plurality of interested third parties D, which may possibly not be able to selectively access all the data, but only data to which access is granted, especially by the user. Such third parties D may include the vehicle owner, the manufacturer, roadside assistance and repair service providers, and any other third party.

Figure 2:
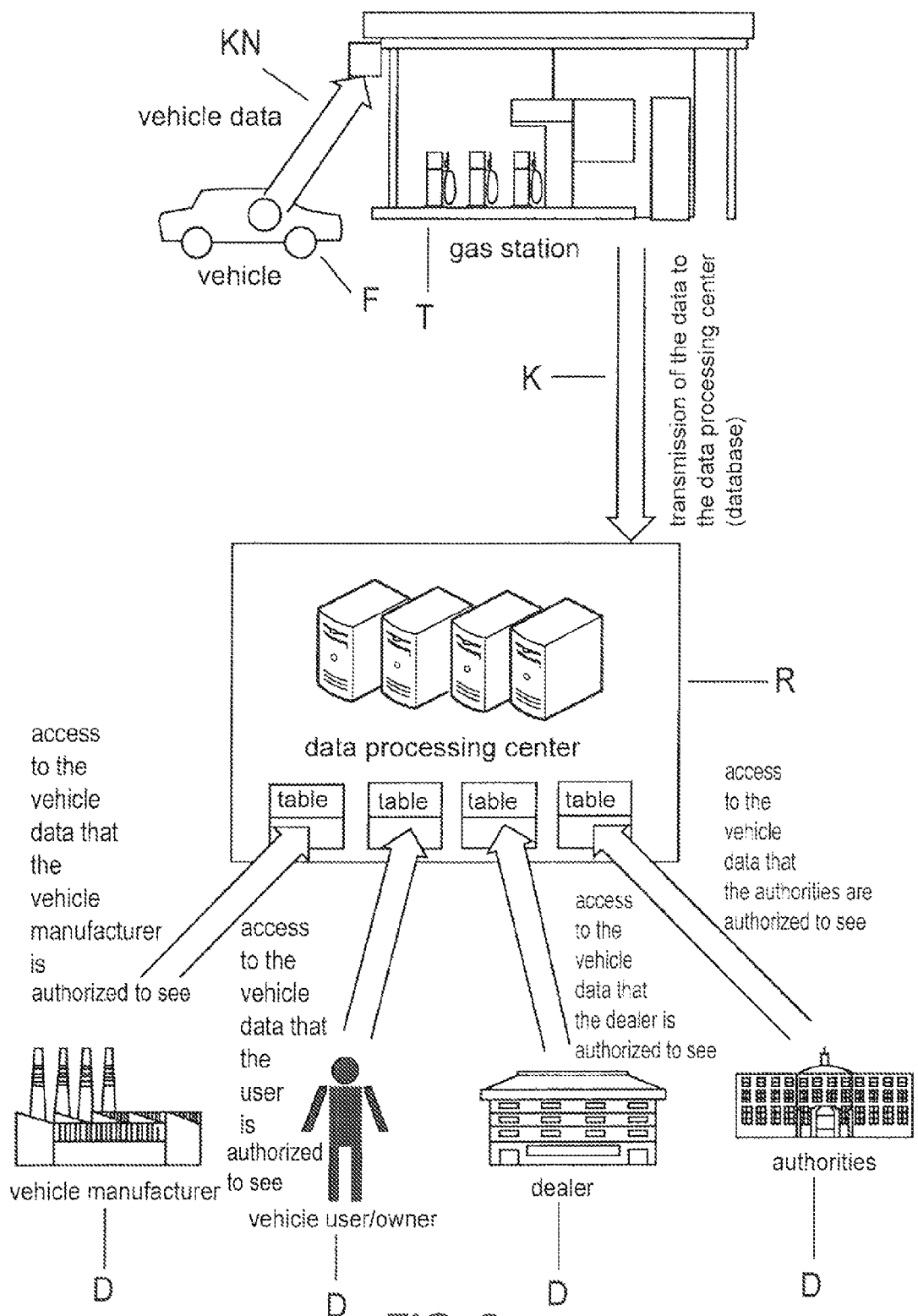
FIG. 2 shows another embodiment of the present invention.

FIG. 2 shows another embodiment of the present invention, in which the data is transmitted from on-board memory S of a vehicle F via a near field communication link KN to a receiver E, which is disposed at a strategically selected location, here at a gas station T. Subsequently, the data collected by receiver E of gas station T is transmitted to data processing center R via a communication link K.

At data processing center R, or at an earlier stage, the individual data items may be categorized, which is here symbolized by the different tables. Then, the various individual interested third parties D can access only the vehicle data that they are authorized to see, respectively. Thus, access may be controlled by assigning access rights internally. The assignment of access rights may be done by the user, in particular by the user consenting to access by the various interested third parties D. The user may give such consent at the time he/she purchases a vehicle, or later in any other suitable way, for example, by concluding a vehicle-related contract, such as an insurance contract.

Figure 3:
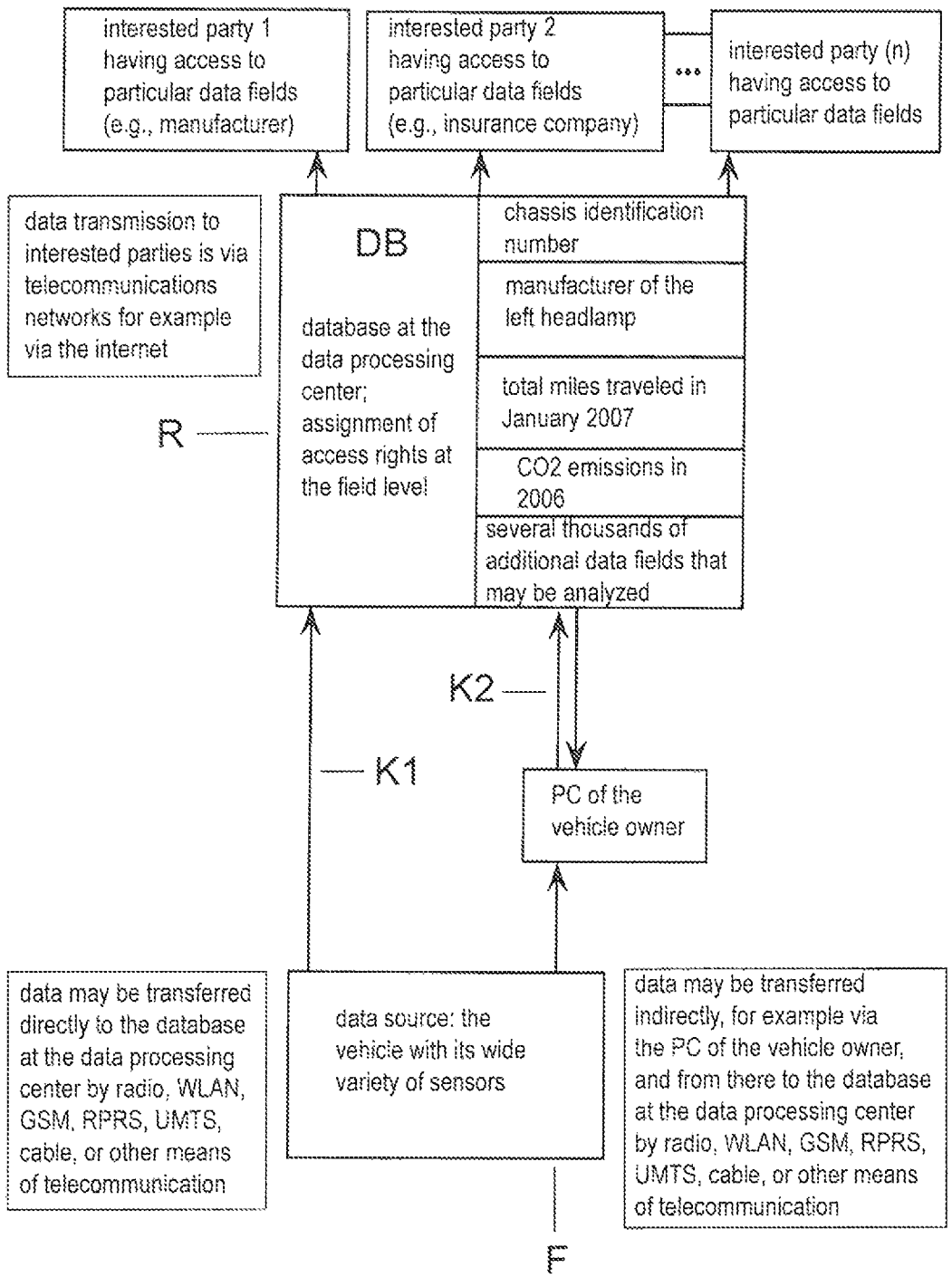
FIG. 3 is another chart illustrating the method of the present invention.

FIG. 3 is another chart illustrating the method of the present invention. It is shown that a wide variety of data is made available as a data source by a vehicle F, said data being acquired, for example, by various sensors of the vehicle. As illustrated by this figure, there may be either a direct communication connection K1 or an indirect communication connection K2 via the PC, i.e., the computer of the vehicle owner.

In both cases, the data is transferred to a database DB of data processing center R, it being possible to provide a plurality of a data processing centers. In particular, each of the plurality of data processing centers may be assigned a different category of data.

As illustrated by way of example, the data may include, for example, the chassis identification number, manufacturer information, miles traveled, measured emissions, etc. The various interested parties can then access the particular fields that are intended for them, respectively.

With respect to all embodiments, it should be noted that the technical features mentioned in connection with one embodiment can be used not only in that particular embodiment, but also in any of the other embodiments. The technical features disclosed in this description of the invention can be used alone or in any combination.

The invention is not limited to the embodiments disclosed herein; reference should be had to the appended claims.

What is claimed is:

1. A method for managing vehicle data of a motor vehicle, the method comprising:
   storing the vehicle data in an on-board memory;
   associating the stored vehicle data with the vehicle using a vehicle identifier;
   categorizing the stored vehicle data in the on-board memory of the vehicle based on authorizations of third parties to view the stored vehicle data;
   transmitting, by a communication device of the vehicle, the categorized stored data to at least one of a plurality of stationary receiving stations;
   transmitting, by the at least one of the plurality of stationary receiving stations, the transmitted stored data to a plurality of data processing centers of a telecommunications network via a telecommunications connection as specified by the categorizing of the stored data such that each of the plurality of data processing centers receives a different category of the stored data; and
   making the transmitted data available at the data processing centers for retrieval by the third parties.

2. The method as recited in claim 1, wherein the transmitting by the communication device includes transmitting the stored data to the at least one of the plurality of stationary receiving stations via a near field communication link.

3. The method as recited in claim 1, wherein the at least one of the plurality of stationary receiving stations includes a receiving device disposed at at least one of a gas station, a bridge, a vehicle safety inspection station, a parking lot, and a traffic light.

4. The method as recited in claim 2, wherein the at least one of the plurality of stationary receiving stations includes a receiving device disposed at at least one of a gas station, a bridge, a vehicle safety inspection station, a parking lot, and a traffic light.

5. The method as recited in claim 1, wherein:
   the on-board memory includes a portable data storage medium that can be removed from the vehicle, the portable data storage medium being configured to extract and transfer the stored data to a data processing system; and
   wherein the method further comprises transmitting the stored data from the data processing system to respective ones of the plurality of data processing centers via the telecommunications network.

6. The method as recited in claim 5, wherein the data processing system is a data processing system of a user of the vehicle.

7. The method as recited in claim 1, wherein the transmitting steps are performed in a manner limited by volume or category of the stored data.

8. The method as recited in claim 5, wherein the transmitting steps are performed in a manner limited by volume or category of the stored data.

9. The method as recited in claim 8, wherein the transmitting the stored data from the data processing system is performed using the portable data storage medium.

10. The method as recited in claim 1, wherein the transmitted data is made available for retrieval by the third parties at the data processing centers as specified by the categorizing of the stored vehicle data.

11. The method as recited in claim 1, wherein the stored data is categorized by at least one of dealer data, user data, manufacturer data and authority data.

12. The method as recited in claim 1, further comprising calculating vehicle-related charges individually based on the transmitted data.

13. The method as recited in claim 12, wherein the vehicle-related charges include taxes.

14. The method as recited in claim 12, wherein the transmitted data include at least one of fuel consumption and emissions output.

15. The method as recited in claim 12, wherein the third parties include authorities entitled to the charges, and further comprising making the calculated charges available for retrieval by the authorities.

16. The method as recited in claim 1, further comprising authorizing, by a user of the vehicle, use of the transmitted data.

17. The method as recited in claim 16, wherein the authorizing includes authorizing based upon a category of the transmitted data.

18. The method as recited in claim 1, wherein the third parties include at least one of manufacturers, dealers, vehicle users, authorities, insurance companies, and roadside assistance service providers.

19. The method as recited in claim 18, further comprising:
   associating the third parties with a category of the transmitted data; and
   granting access to the transmitted data based upon the category.

20. The method as recited in claim 1, wherein the on-board memory includes a portable data storage medium, and further comprising sending, at the end of life of the vehicle, the portable data storage medium to at least one of a manufacturer of the vehicle and an authority.

21. The method as recited in claim 1, wherein the vehicle data includes operational data of the vehicle.

22. A system for managing vehicle data of a motor vehicle, the system comprising:
   an on-board memory configured to store the vehicle data in categories based on authorizations of third parties to view the stored data in association with a vehicle identifier of the vehicle; and
   a transmitter configured to transmit the categorized stored data to at least one of a plurality of stationary receiving stations that are configured to transmit the transmitted stored data via a telecommunications connection to a plurality of data processing centers of a telecommunications network as specified by the categorized stored data such that each of the plurality of data processing centers receives a different category of the stored data, the data processing centers being configured to make the transmitted data available for retrieval by third parties.

23. A method for managing vehicle data of a motor vehicle, the method comprising:
   storing the vehicle data in an on-board memory;
   associating the stored vehicle data with the vehicle using a vehicle identifier;
   categorizing the stored vehicle data in the onboard memory of the vehicle based on authorizations of third parties to view the stored vehicle data;
   transmitting the categorized stored data via a telecommunications connection to a plurality of data processing centers of a telecommunications network as specified by the categorizing of the stored data such that each of the plurality of data processing centers receives a different category of the stored data; and
   making the transmitted data available at the data processing centers for retrieval by the third parties based on the authorizations.

24. The method as recited in claim 23, wherein the transmitting includes transmitting the stored vehicle data to a receiver device disposed at least one of a plurality of stationary receiving stations and configured to transmit the data to at least one of the plurality of data processing centers.

* * * * *